US010648621B2

(12) United States Patent
King

(10) Patent No.: US 10,648,621 B2
(45) Date of Patent: May 12, 2020

(54) TRAPPED GAS TRANSFER AND METERING SYSTEM

(71) Applicant: John B. King, Lockport, NY (US)

(72) Inventor: John B. King, Lockport, NY (US)

( * ) Notice: Subject to any disclaimer, the term of this patent is extended or adjusted under 35 U.S.C. 154(b) by 133 days.

(21) Appl. No.: 16/044,963

(22) Filed: Jul. 25, 2018

(65) Prior Publication Data

US 2019/0032853 A1    Jan. 31, 2019

Related U.S. Application Data

(60) Provisional application No. 62/537,174, filed on Jul. 26, 2017.

(51) Int. Cl.

| F17C 13/02 | (2006.01) |
|---|---|
| B67D 7/36 | (2010.01) |
| B67D 7/32 | (2010.01) |
| B67D 7/08 | (2010.01) |
| G01F 1/00 | (2006.01) |

(52) U.S. Cl.
CPC .............. *F17C 13/028* (2013.01); *B67D 7/08* (2013.01); *B67D 7/3272* (2013.01); *B67D 7/36* (2013.01); *G01F 1/00* (2013.01); *B67D 7/3218* (2013.01); *F17C 2221/033* (2013.01); *F17C 2227/0157* (2013.01); *F17C 2250/043* (2013.01); *F17C 2250/0426* (2013.01); *F17C 2260/024* (2013.01); *F17C 2260/035* (2013.01); *F17C 2265/068* (2013.01)

(58) Field of Classification Search
CPC ....... F17C 13/028; B67D 7/08; B67D 7/3272; B67D 7/36; G01F 1/00
USPC ......................................................... 141/44
See application file for complete search history.

(56) References Cited

U.S. PATENT DOCUMENTS

| 2,958,218 | A | * | 11/1960 | Hill ....................... G01F 25/003 |
|---|---|---|---|---|
| | | | | 73/1.27 |
| 3,073,688 | A | | 1/1963 | McCune |
| 4,345,613 | A | | 8/1982 | Mills et al. |
| 4,590,790 | A | * | 5/1986 | Hicks .................. G01F 25/0053 |
| | | | | 73/1.26 |
| 4,649,734 | A | * | 3/1987 | Hillburn ............. G01F 25/0007 |
| | | | | 73/1.19 |
| 4,682,623 | A | | 7/1987 | Scherer |
| 5,139,576 | A | | 8/1992 | Davis |
| 5,421,188 | A | * | 6/1995 | Sager .................. G01F 25/0007 |
| | | | | 700/282 |
| 6,338,359 | B1 | | 1/2002 | Welker |
| 6,880,567 | B2 | | 4/2005 | Klaver et al. |

(Continued)

FOREIGN PATENT DOCUMENTS

GB        2431485        4/2007

OTHER PUBLICATIONS http://www.hydropac.com/lx-series-gas-compressors.html, last accessed Dec. 3, 2018.

*Primary Examiner* — Timothy L Maust
*Assistant Examiner* — James R Hakomaki
(74) *Attorney, Agent, or Firm* — Simpson & Simpson, PLLC

(57) ABSTRACT

A fluid transfer system, including a first stage, including an inlet, a surge tank, and a first cylinder operatively arranged to pump the fluid from the inlet to the surge tank, and a second stage, including an outlet, a knock out tank, and a second cylinder operatively arranged to pump the fluid from the surge tank into the knockout tank.

20 Claims, 2 Drawing Sheets

(56) References Cited

U.S. PATENT DOCUMENTS

| | | | |
|---|---|---|---|
| 7,475,591 B2 * | 1/2009 | Buckley | G01N 3/12 |
| | | | 73/49.5 |
| 7,621,293 B2 | 11/2009 | Snowbarger | |
| 7,905,251 B2 | 3/2011 | Flanders | |
| 8,051,875 B2 | 11/2011 | Edwards | |
| 9,714,852 B2 * | 7/2017 | Moore | G01F 1/00 |
| 2005/0199286 A1 | 9/2005 | Appleford et al. | |
| 2010/0223976 A1 * | 9/2010 | Jakubenas | G01F 1/7042 |
| | | | 73/1.16 |
| 2011/0133942 A1 | 6/2011 | Flanders | |
| 2015/0378366 A1 | 12/2015 | Lerner et al. | |

* cited by examiner

TRAPPED GAS TRANSFER AND METERING SYSTEM

CROSS-REFERENCE TO RELATED APPLICATIONS

This application claims the benefit under 35 U.S.C. § 119(e) of U.S. Provisional Application No. 62/537,174, filed Jul. 26, 2017, which application is incorporated herein by reference in its entirety.

FIELD

The present disclosure relates to a gas transfer system, and more particularly, to a trapped gas transfer and metering system that transfers a pressurized gas or fluid volume from a trapped area in a piping system to a point past the trap, either pressurized or unpressurized, to reduce the trap pressure to atmospheric without any release of gas to the atmosphere.

BACKGROUND

The production of natural gas or oil from a wellhead to the customer is a lengthy process that involves many separate production operations that transform the raw material from the ground to the refined product that the customer consumes. The entire operation requires many individual companies, each of which takes ownership of the stream in order to perform their particular operation. During this lengthy process, the material changes custody many times and is put through various preparation and refinement operations. From the wellhead to the customer user point, the conditions and composition of the material require differing processes. Material prepared for the collection lines that transfer it from the wellhead to a midstream refinery are heavily processed. The preparation at the well head most often involves both a dewatering operation and compression operation. Once a suitable specification is realized, the material is charged into the collection lines that transmit it to the midstream refinery. The midstream refinery is connected to a web network of underground piping that serves to supply the refinery from the many wellheads in the network. The midstream refinery receives the product and sends it to the slug catcher. The product then proceeds to a further dewatering system and then to the cryo unit, where it is processed to separate out natural gas liquids (NGLs), and is broken into individual components for further refinement. These components are further dried and processed with some of the stream prepared to specification for sale. Specification quality material will then be transferred by another underground network to a contracted buyer, with the remainder delivered via an underground network to a fractionating plant for further processing of specialty type gases and products. The liquids themselves are collected and transferred via a pipe line, train, or truck to contracted buyers. Specification quality methane from the midstream refinery is transferred via an underground pipe line to natural gas energy suppliers. These suppliers serve as the distribution network to the public consumer.

These operations involve diverse process equipment and piping systems and are subject to process upsets, maintenance, and raw material variables that are a part of any industry. In dealing with these realities, the gas industry has procedures and operations in place to mitigate loss of production and loss of raw material product. Some of these operations require the venting of product to the atmosphere. This has historically been accepted as an operational industry practice. The real loss of profit due to atmospheric venting is revenue not realized through sales of vented volumes and U.S. Environmental Protection Agency (EPA) emissions limitations and regulation costs.

Thus, there is a long felt need for a system that recovers trapped gas that would otherwise be vented to the atmosphere. There is also a long felt need for a metering system to measure the amount of trapped gas that is recovered.

SUMMARY

According to aspects illustrated herein, there is provided a fluid transfer system, comprising a first stage, including an inlet, a surge tank, and a first cylinder operatively arranged to pump the fluid from the inlet to the surge tank, and a second stage, including an outlet, a knock out tank, and a second cylinder operatively arranged to pump the fluid from the surge tank into the knockout tank.

According to aspects illustrated herein, there is provided a fluid transfer and metering system, comprising a first stage arranged to receive fluid, including an inlet, a surge tank, and a first cylinder operatively arranged to pump the fluid from the inlet to the surge tank, the first cylinder being actuated by a first hydraulic driver, and a second stage arranged to transfer and measure the fluid, including an outlet, a knock out tank, and a second cylinder operatively arranged to pump the fluid from the surge tank into the knockout tank, the second cylinder being actuated by a second hydraulic driver.

One objective of the trapped gas transfer and metering system or emissions recovery transfer meter is to provide a method to transfer a pressurized gas volume from a trapped section of a piping system to a point in the piping system past the trap instead of venting the trapped gas to atmosphere.

Another objective of the trapped gas transfer and metering system is to accurately measure the trapped gas volume transfer and generate volume transfer data for EPA reporting.

The trapped gas transfer and metering system may further comprise a liquid drain and containment reservoir, for blow down of the trapped gas transfer and metering system.

The trapped gas transfer and metering system may further comprise a plurality of sensors arrange proximate the pressure devices and a computer. The computer determines how much gas volume is transferred through the system and can store that information or relay/communicate that volume to a remote location.

The trapped gas transfer and metering system may further comprise an emergency shutdown. The emergency shutdown would initiate a predetermined routing commensurate with the customer's emergency shut down (ESD) procedures.

The trapped gas transfer and metering system of the present disclosure is an economical and effective solution to specific atmospheric venting operations currently in place in the gas industry. The trapped gas transfer and metering system effectively turns the cost of atmospheric venting operation variables into a gain through recovery, transfer, and metering. The trapped gas transfer and metering system, when applied, can reduce atmospheric venting volumes by up to 99.9%. The vented volume of product is recovered and transferred to a profitable stream rather than exhausted to the atmosphere. The volume of product is also precisely metered with total volume recovery data generation for use in emissions reporting. The trapped gas transfer and metering system is compact and simple in operation, and can be embodied as either a mobile unit for field operations or fully integrated within existing facilities, the installation of which would require only minimal rework to those facilities. The trapped gas transfer and metering system will handle any kind of compressible or non-compressible fluids, including cryo transfers. Implementation of the trapped gas transfer and metering system into present facilities or field operations will not impact current schedules of operations or manpower requirements. The trapped gas transfer and metering system does not require special instruction for safe operation and is fully customizable to interact with all facility control systems and networks deemed necessary by the customer.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
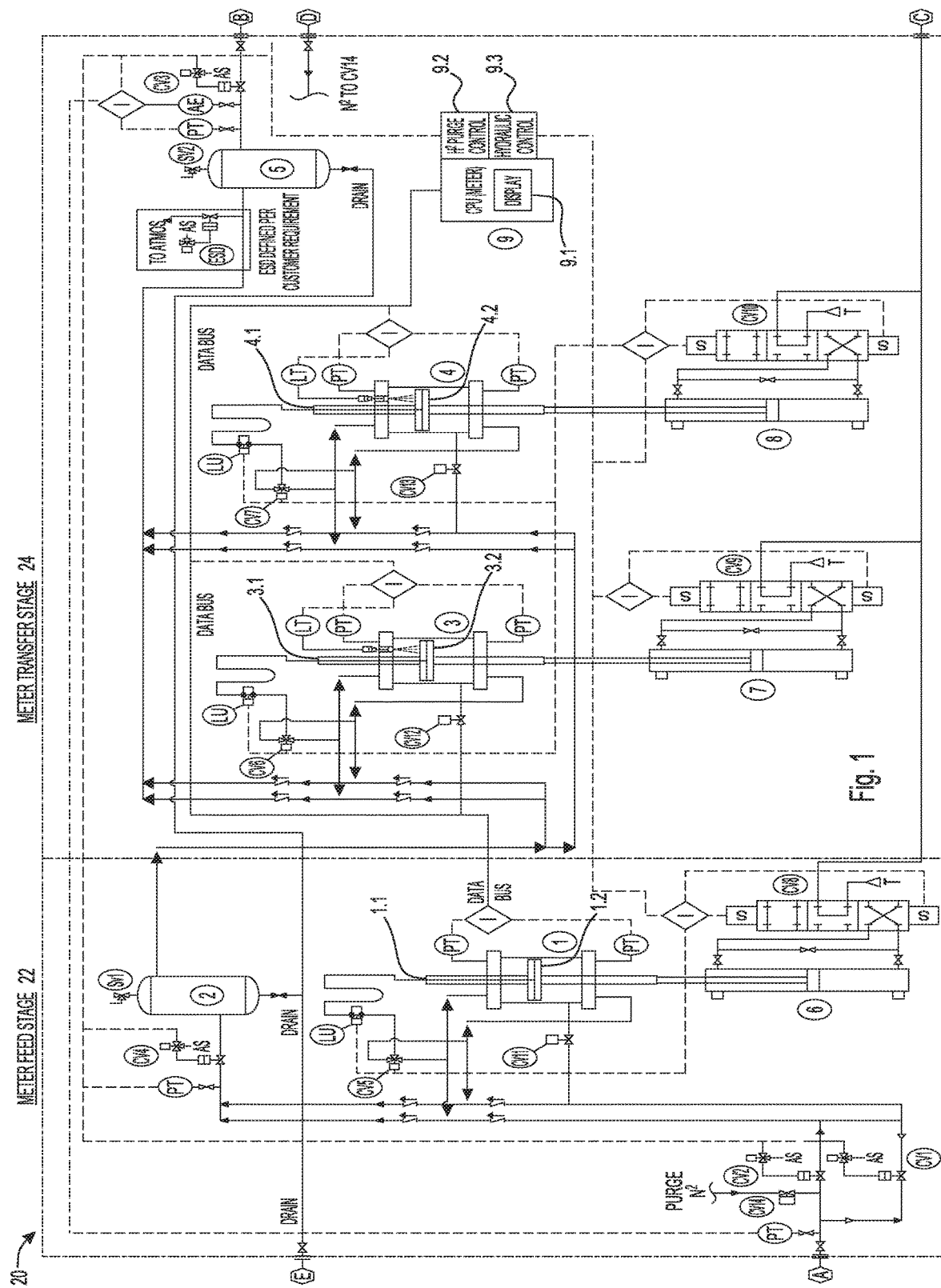
FIG. 1 is a schematic diagram of a trapped gas transfer and metering system; and, FIG. 2 is a diagram of the trapped gas transfer and metering system connected to a piping system.

Adverting now to the figures, FIG. 1 is a schematic diagram of trapped gas transfer and metering system 20. Trapped gas transfer and metering system 20 is a two-stage recovery transfer system having first stage 22, and second stage 24.

First stage 22 is a meter feed stage and generally comprises meter feed cylinder 1 and meter feed surge tank 2. First stage 22 is connected to the recovery source and feeds recovered volume (i.e., gas) to the metering transfer rams of second stage 24, as will be discussed in greater detail below. Meter feed cylinder 1 is a hydraulically operated proprietary pneumatic feed transfer ram. First stage 22 may further comprise additional controls and instruments. The connection of first stage 22 to the recovery source can be a hard-piped or coupled hose-type connection and only requires an existing block connection (i.e., a block valve) of suitable size. One suitable connection can occur at existing vents. If no connection is available a proper hot tap and block can be installed on piping. Preferably, the source block valve is in the range of 1½" to 2" in diameter. First stage 22 operates to capture the source volume to be recovered and directs it to the second stage 24. First stage 22 also provides meter central processing unit (CPU) and system control 9 with required data for monitoring the source pressure and operation.

Second stage 24 is a metering transfer stage and is fed from feed surge tank 2 of first stage 22 and directs the captured source volume to a designated target (e.g., to a point downstream past the trap). Second stage 24 generally comprises meter cylinder 3, meter cylinder 4, and meter knock out tank 5. Meter cylinders 3 and 4 are hydraulically operated proprietary pneumatic metering transfer rams. Second stage 24 may further comprise controls and instruments. Second stage 24 is connected to the designated target, for example, via an existing block connection in the same fashion as first stage 22 is connected to the recovery source. This is the point where the recovered volume is introduced back into the customer piping system completing the recovery. Second stage 24 also provides data to CPU and system control 9 for monitoring the system pressure and operation.

Meter feed cylinder 1 is a hydraulically operated proprietary double acting pneumatic transfer ram. Meter feed cylinder comprises shaft 1.1 and ram 1.2. Meter feed cylinder 1 is a pneumatic cylinder and is coupled with feed cylinder hydraulic driver 6. As shown, meter feed cylinder 1 uses a double check valve arrangement to achieve a directed suction/discharge pumping action. This pumping action has no required head for operation and is capable of drawing a vacuum at the recovery source. Meter feed cylinder 1 is a positive displacement type transfer device and features at least six connections. Meter feed cylinder 1 comprises at least two process connections, which are bi-directional with direction managed by the check valve operation. Meter feed cylinder 1 comprises at least two connections or nodes for pressure monitoring. Pressure transmitters PT transmit data from these nodes to CPU and system control 9 to be used for driver and other operations. A single connection is located on shaft 1.1 of meter feed cylinder 1. This connection is a conduit to the internal ram and supplies backpressure to the labyrinth type ram seal. The supply pressure to this seal is a pilot pressure drawn from the discharge pressure from the active transfer line. The supply pressure is controlled by a signal from CPU and system control 9 that operates meter feed pilot seal control valve CV5, which may be, for example, a 3-way diverting valve. This signal is interlocked with the pressure data sent to CPU and system control 9 by cylinder pressure transmitters PT during operation. The function of meter feed pilot seal control valve CV5 is to reduce the pressure change exerted on the ram seals during operation. The backpressure system of meter feed cylinder 1 also incorporates an adjustable micro misting type lubrication system for cylinder lubrication if required. As shown micro lubricator LU is arranged to lubricate meter feed cylinder 1, including shaft 1.1. The final connection is a nitrogen purge point. During nitrogen purging, the meter feed cylinder 1 is bottomed out and meter feed purge control valve CV11 opens and provides a path for purging the cylinder volume. Meter feed purge control valve CV11 is operated by CPU and system control 9 during the purging operation. Feed cylinder hydraulic driver 6, which is coupled to meter feed cylinder 1, is controlled by meter feed hydraulic directional control valve CV8. Feed cylinder hydraulic driver 6 may comprise solenoid S. Feed cylinder hydraulic driver 6 may also be connected to tank T or the return line to the hydraulic reservoir. Meter feed hydraulic directional control valve CV8 is also connected with the CPU and system control 9 and hydraulic power pack C. Meter feed cylinder 1 may be a double acting double rod guide-type cylinder. Meter feed cylinder 1 may include a double end plate bridle rod configuration to provide the stability required for high pressure pneumatic operations.

Meter feed cylinder 1 is fluidly connected to meter feed inlet A. System inlet control valve CV2 is arranged between meter feed inlet A and meter feed cylinder 1 and controls the flow of volume into the system. System bleed in control valve CV1 is arranged between meter feed inlet A and meter feed cylinder 1 and controls the flow of volume into the system. Nitrogen purge control valve CV14 may be arranged between meter feed inlet A and meter feed cylinder 1 and is operated by CPU and system control 9 during the purging process.

Meter feed surge tank 2 is connected to meter feed cylinder 1 and comprises system surge inlet control valve CV4 and safety relief valve SV1. System surge inlet control valve CV4 controls the flow of volume into meter feed surge tank 2. Pressure transmitter PT may be arranged prior to system surge inlet control valve CV4 to monitor the pressure. Pressure transmitter PT transmits data to CPU and system control 9. Volume is then "pulled" from meter feed surge tank 2 by meter cylinder 3. Meter feed surge tank 2 may also be connected to drain E.

Meter cylinders 3 and 4 are substantially identical to meter feed cylinder 1 except for the integral metering feature. The operation of this metering system is as follows. Because the transfer ram of the cylinder operates as a positive displacement transfer, the known volume of the cylinder (V1) is used in conjunction with the known pressure (P1) of the cylinder volume prior to stroke execution. The movement of the stroke is monitored by a radar device that provides stroke length data from stroke start (X1) to stroke stop (X2) and together with the volume (V1) and pressure data (P1) a calculation of transferred volume is realized at pressure (P1). This volume is then converted to standard cubic feet (scf). An operational data base stores this data in conjunction with the individual stroke event and at the conclusion of the emission recovery operation the data from the individual stroke log for the operation is processed and given as a total volume transfer value in scf. Tight tolerance and accuracy of volume calculation is achieved through menu driven meter set up and variable selection.

Meter cylinder 3 generally comprises shaft 3.1, ram 3.2, pressure transmitters PT, meter pilot seal control valve CV6, micro lubricator LU, meter purge control valve CV12, and radar position sensor LT. Meter cylinder 3 is coupled to meter cylinder hydraulic driver 7 which is controlled by meter hydraulic directional control valve CV9. Meter cylinder hydraulic driver 7 may comprise solenoid S. Meter cylinder hydraulic driver 7 may also be connected to tank T or the return line to the hydraulic reservoir. Meter hydraulic directional control valve CV9 is also connected with the CPU and system control 9 and hydraulic power pack C. Meter cylinder 3 may be a double acting double rod guide-type cylinder. Meter cylinder 3 may include a double end plate bridle rod configuration to provide the stability required for high pressure pneumatic operations.

Meter cylinder 4 generally comprises shaft 4.1, ram 4.2, pressure transmitters PT, meter pilot seal control valve CV7, micro lubricator LU, meter purge control valve CV13, and radar position sensor LT. Meter cylinder 4 is coupled to meter cylinder hydraulic driver 8 which is controlled by meter hydraulic directional control valve CV10. Meter cylinder hydraulic driver 8 may comprise solenoid S. Meter cylinder hydraulic driver 8 may also be connected to tank T or the return line to the hydraulic reservoir. Meter hydraulic directional control valve CV10 is also connected with the CPU and system control 9 and hydraulic power pack C. Meter cylinder 4 may be a double acting double rod guide-type cylinder. Meter cylinder 4 may include a double end plate bridle rod configuration to provide the stability required for high pressure pneumatic operations.

Meter knock out tank 5 is fluidly connected to meter cylinders 3 and 4. Meter knock out tank 5 is also connected to meter outlet B. Meter knock out tank 5 comprises system outlet control valve CV3 and safety relief valve SV2. System outlet control valve CV3 controls the flow of volume out of meter knock out tank 5 to meter outlet B. Pressure transmitter PT may be arranged prior to system outlet control valve CV3 to monitor the pressure leaving meter knock out tank 5. Pressure transmitter PT transmits data to CPU and system control 9. Analyzer element AE may be arranged prior to system outlet control valve CV3. Analyzer element AE and pressure transmitter PT may be connected interlock I. Meter knock out tank 5 may also be connected to drain E. In an example embodiment, meter knock out tank 5 is connected only to one meter cylinder (i.e., for a system with only one meter cylinder). In an example embodiment, meter knock out tank 5 is connected to three or more meter cylinders. Emergency shut down control valve ESD is arranged prior to meter knock out tank 5. Emergency shut down control valve ESD may comprise a vent to atmosphere. Emergency shut down control valve ESD may be connected to air supply AS. Additionally air supply AS may also be connected to system bleed in control valve CV1, system inlet control valve CV2, system outlet control valve CV3, and system surge inlet control valve CV4.

Trapped gas transfer and metering system 20 utilizes proprietary internal control logic but is capable of communicating with existing facility protocol as required for integration. Integration into facility operations can include tying into compressor blow down operations, unplanned venting operations to the flare system, and emergency shut down operations. CPU and system control 9 allows the trapped gas transfer and metering system 20 to run a transfer/metering operation "hands free" or without the need for manual measurement. CPU and system control 9 is a menu driven point of access to operation data and reporting, and generally comprises display 9.1. CPU and system control 9 may further comprise nitrogen ($N^2$) purge control 9.2, which is used to control purge control valves CV11, CV12, CV13, CV14. Nitrogen purge control 9.2 is connected to nitrogen supply D. CPU and system control 9 may further comprise hydraulic control 9.3, which is used to control hydraulic directional control valves CV8, CV9, and CV10.

Trapped gas transfer and metering system 20 can be configured in a variety of capacities and formats, which allows for various configurations. For example, trapped gas transfer and metering system 20 may be a hard piped permanent system integrated with a specific plant operation to a fully self-contained, or a mobile unit that fits in the back of a standard pickup truck for use in various field operations. Trapped gas transfer and metering system 20 can be used to recover, meter, and transfer any compressible or non-compressible fluid that needs to be moved. In some embodiments, trapped gas transfer and metering system 20 is used as an alternative to venting fluids into the atmosphere in compressor blow down operations and pigging operations, and any required movement of fluids that may not be accomplished with the existing available piping systems. While the configurations for this system do vary, the basic unit itself remains while ancillary systems may be added or removed.

Figure 2:
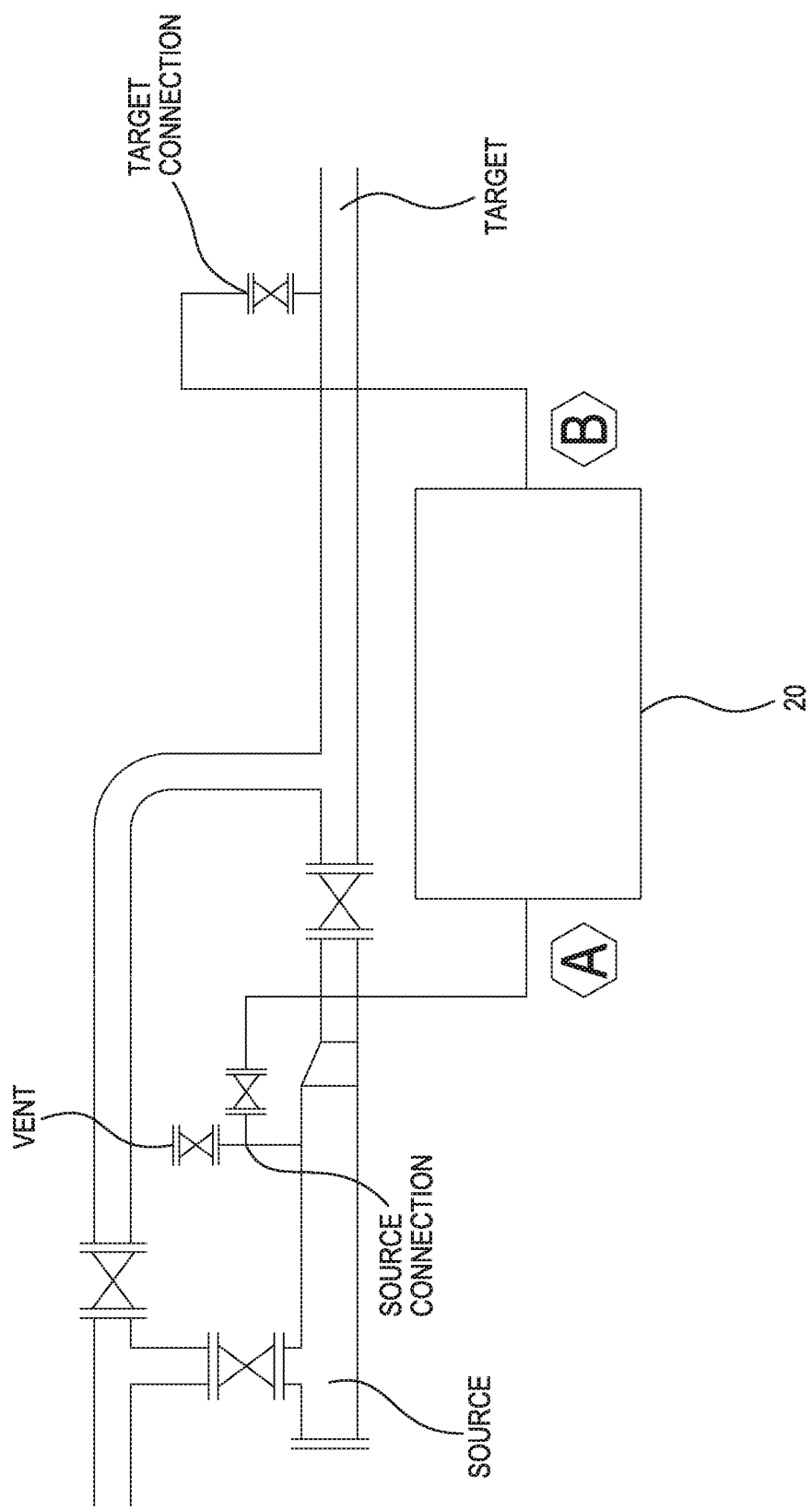

FIG. 2 is a diagram of the trapped gas transfer and metering system connected to a piping system. The following is a functional description of trapped gas transfer and metering system 20 for pigging operations, as shown in FIG. 2. However, it should be appreciated that the use of trapped gas transfer and metering system 20 is not limited to pigging operations or the pig launcher transfer scenario diagram of FIG. 2. Meter feed inlet A is connected at the "source" point and meter outlet B is connected at the "target" point. The connect block valves at the source and target points are in the closed position. A nitrogen purge is initiated to purge all oxidizer from the system as follows: control valves CV1, CV2, CV4, and CV14 are open. When system analyzer AE indicates the system is ready, control valves CV1, CV2, and CV14 are closed and system surge inlet control valve CV4 remains open and a "READY" status is displayed. Subsequently a "RUN" status can be initiated (i.e., transferring the gas or fluid). The customer block valves are manually opened and a pressure signal from pressure transmitter PT at system bleed in control valve CV1 triggers a "RUN" mode that is manually started by the operator. In "RUN" mode, system bleed in control valve CV1 is throttled to bleed "source" pressure into transfer system 20, specifically meter feed stage 22. When delta "0" (i.e., a pressure difference equal to 0 psi) is reached between inlet pressure transmitter PT on meter feed cylinder 1 and outlet pressure transmitter PT on meter feed cylinder 1, system bleed in control valve CV1 is closed and control valves CV2 and CV4 are opened. System outlet control valve CV3 remains open. This condition is interlocked and allows the operation of the hydraulic rams to begin the "recover transfer" of source fluid to the target. The reduction or "draw down" of pressure at the source is monitored for drop. The pressure in meter feed surge tank 2 is monitored with safety relief valve SV1 and a "HIGH" condition that is interlocked with the hydraulic feed circuit for over pressure shut down of the feed ram. The check valve circuit separates the two stages of operation. When a predetermined source pressure is reached, for example, 14.7 pounds per square inch (psi), the hydraulic feed circuit (i.e., meter feed stage 22) is shut down and control valves CV2 and CV4 are closed. Though first stage 22 and second stage 24 are independent, they are connected in operation by the control logic with second stage 24 operating during first stage 22 "source" pressure reduction. After first stage 22 is shutdown, second stage 24 continues to operate drawing down the remaining pressure bottled in meter feed surge tank 2 and transferring the volume to the target. When pressure transmitter PT at meter feed surge tank 2 reaches a predetermined amount, for example 14.7 psi, the metering transfer hydraulic circuit is shut down and system outlet control valve CV3 is closed. Subsequently, a "TRANSFER COMPLETE" condition is signaled and a volume of transfer is displayed at CPU and system control 9. The block valves at the source and target are now manually closed isolating trapped gas transfer and metering system 20 from the customer piping. The pig launcher manual vent is now opened to verify an atmospheric pressure condition in the launcher trap. The trap is now safe to open as the trapped pressure has been transferred to the target. Trapped gas transfer and metering system 20 is now disconnected from the pigging operation equipment and shut down. It should be appreciated that trapped gas transfer and metering system 20 is a custom unit that will operate with a wide variety of transfer scenarios and fluids. The basic design of the present disclosure will transfer both compressible and non-compressible fluids as well as cryogenic transfers with pressure, temperature, and material specification changes incorporated to achieve compatibility with the desired application.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

A Meter feed inlet
B Meter outlet
C Hydraulic power pack
D Nitrogen supply
E Drain
1 Meter feed cylinder
1.1 Shaft
1.2 Ram
2 Meter feed surge tank
3 Meter cylinder
3.1 Shaft
3.2 Ram
4 Meter cylinder
4.1 Shaft
4.2 Ram
5 Meter knock out tank
6 Feed cylinder hydraulic driver
7 Meter cylinder hydraulic driver
8 Meter cylinder hydraulic driver
9 Central processing unit (CPU) and system control
9.1 Display
9.2 Nitrogen purge control
9.3 Hydraulic control
20 Trapped gas transfer and metering system
22 First stage
24 Second stage
CV1 System bleed in control valve
CV2 System inlet control valve
CV3 System outlet control valve
CV4 System surge inlet control valve
CV5 Meter feed pilot seal control valve
CV6 Meter pilot seal control valve
CV7 Meter pilot seal control valve
ESD Emergency shut down control valve
CV8 Meter feed hydraulic directional control valve
CV9 Meter hydraulic directional control valve CV10 Meter hydraulic directional control valve
CV11 Meter feed purge control valve
CV12 Meter purge control valve
CV13 Meter purge control valve
CV14 Nitrogen purge control valve
LU Micro lubricators
LT Radar position sensors
PT Pressure transmitters
AE Analyzer element
SV1 Safety relief valve
SV2 Safety relief valve
AS Air supply
S Solenoid
T Tank (return line to hydraulic reservoir)
I Interlock

What is claimed is:

1. A fluid transfer and metering system, comprising:
a first stage, including:
an inlet;
a surge tank; and,
a first cylinder operatively arranged to pump the fluid from the inlet to the surge tank; and,
a second stage, including:
an outlet;
a knock out tank; and,
a second cylinder operatively arranged to pump the fluid from the surge tank into the knockout tank.

2. The fluid transfer and metering system as recited in claim 1, wherein the second stage further comprises a third cylinder operatively arranged to pump the fluid from the surge tank into the knockout tank.

3. The fluid transfer and metering system as recited in claim 2, wherein:
the first cylinder is actuated by a first hydraulic driver;
the second cylinder is actuated by a second hydraulic driver; and,
the third cylinder is actuated by a third hydraulic driver.

4. The fluid transfer and metering system as recited in claim 3, wherein:
the first hydraulic driver is controlled by a first directional control valve;
the second hydraulic driver is controlled by a second directional control valve; and,
the third hydraulic driver is controlled by a third directional control valve.

5. The fluid transfer and metering system as recited in claim 4, wherein the first, second, and third directional control valves are connected to a hydraulic control system.

6. The fluid transfer and metering system as recited in claim 2, further comprising a plurality of sensors arranged proximate the first, second, and third cylinders.

7. The fluid transfer and metering system as recited in claim 6, further comprising a central processing unit arranged to receive data from said plurality of sensors.

8. The fluid transfer and metering system as recited in claim 7, wherein said plurality of sensors comprises at least one of pressure transmitters, radar position sensors, and analyzer elements.

9. The fluid transfer and metering system as recited in claim 2, wherein the second and third cylinders are operatively arranged to pump the fluid from the meter knock out tank to the outlet.

10. The fluid transfer and metering system as recited in claim 1, wherein:
the surge tank is fluidly connected to a drain and comprises a first safety relief valve; and,
the knock out tank is fluidly connected to the drain and comprises a second safety relief valve.

11. The fluid transfer and metering system as recited in claim 1, further comprising a Nitrogen purge system fluidly connected with at least one of the first and second cylinders.

12. The fluid transfer and metering system as recited in claim 11, wherein the Nitrogen purge system is fluidly connected with at least one of the first and second cylinders via one or more purge control valves.

13. The fluid transfer and metering system as recited in claim 1, further comprising an inlet control valve arranged after the inlet.

14. The fluid transfer and metering system as recited in claim 11, further comprising a bleed in control valve arranged after the inlet and in parallel with the inlet control valve.

15. The fluid transfer and metering system as recited in claim 1, further comprising an outlet control valve arranged before the outlet.

16. The fluid transfer and metering system as recited in claim 1, further comprising an emergency shut down control valve arranged before the knock out tank.

17. The fluid transfer and metering system as recited in claim 2, further comprising one or more lubricators arranged proximate the first, second, and third cylinders.

18. The fluid transfer and metering system as recited in claim 2, wherein:
the first cylinder includes a first pilot seal control valve;
the second cylinder includes a second pilot seal control valve; and,
the third cylinder includes a third pilot seal control valve.

19. A fluid transfer and metering system, comprising:
a first stage arranged to receive fluid, including:
an inlet;
a surge tank; and,
a first cylinder operatively arranged to pump the fluid from the inlet to the surge tank, the first cylinder being actuated by a first hydraulic driver; and,
a second stage arranged to transfer and measure the fluid, including:
an outlet;
a knock out tank; and,
a second cylinder operatively arranged to pump the fluid from the surge tank into the knockout tank, the second cylinder being actuated by a second hydraulic driver.

20. The fluid transfer and metering system as recited in claim 19, wherein the second cylinder further comprises at least one pressure sensor arranged to measure the fluid that is being transferred.

* * * * *